(12) United States Patent
Dimke et al.

(10) Patent No.: US 10,476,315 B2
(45) Date of Patent: Nov. 12, 2019

(54) WIRELESS CHARGING TRANSMITTER WITH FOREIGN OBJECT AND LIVING OBJECT DETECTION SYSTEMS

(71) Applicant: WiTricity Corporation, Watertown, MA (US)

(72) Inventors: Bernward Dimke, Munich (DE); Milenko Stamenic, Neubiberg (DE)

(73) Assignee: WiTricity Corporation, Watertown, MA (US)

(*) Notice: Subject to any disclaimer, the term of this patent is extended or adjusted under 35 U.S.C. 154(b) by 0 days.

(21) Appl. No.: 16/292,792

(22) Filed: Mar. 5, 2019

(65) Prior Publication Data
US 2019/0199143 A1 Jun. 27, 2019

Related U.S. Application Data

(63) Continuation of application No. 15/602,565, filed on May 23, 2017, now Pat. No. 10,256,674.

(51) Int. Cl.
| | |
|---|---|
| *G06F 9/455* | (2018.01) |
| *G06F 17/50* | (2006.01) |
| *H02J 50/60* | (2016.01) |
| *H02J 7/02* | (2016.01) |
| *H02J 50/12* | (2016.01) |
| *B60L 53/12* | (2019.01) |
| *B60L 53/30* | (2019.01) |

(52) U.S. Cl.
CPC ............ *H02J 50/60* (2016.02); *B60L 53/12* (2019.02); *B60L 53/30* (2019.02); *H02J 7/025* (2013.01); *H02J 50/12* (2016.02)

(58) Field of Classification Search
USPC ................. 320/106, 107, 108, 109, 110
See application file for complete search history.

(56) References Cited

U.S. PATENT DOCUMENTS

| | | | |
|---|---|---|---|
| 2010/0214112 A1* | 8/2010 | Ishihara | B60R 25/246 340/686.1 |
| 2014/0333256 A1* | 11/2014 | Widmer | B60L 11/182 320/108 |
| 2015/0260835 A1* | 9/2015 | Widmer | G01S 13/04 342/27 |
| 2015/0323694 A1* | 11/2015 | Roy | H02J 17/00 307/104 |
| 2015/0331135 A1* | 11/2015 | Widmer | G01V 3/101 324/234 |
| 2015/0348417 A1* | 12/2015 | Ignaczak | G08G 1/165 340/435 |

(Continued)

*Primary Examiner* — Brian Ngo
(74) *Attorney, Agent, or Firm* — Hunter Clark PLLC

(57) ABSTRACT

Techniques for detecting foreign objects in a charging path of a wireless power transfer system are disclosed. An example apparatus for detecting a presence of a foreign object includes a foreign object detection (FOD) system, a living object protection (LOP) system, a control circuit operably coupled to the FOD system and the LOP system and configured to detect a change in one or more power transfer parameters, perform a calibration procedure on the FOD system based on the change in the one or more power transfer parameters, operate the LOP system in a high sensitivity mode concurrently with the calibration procedure, and operate the LOP system in a standard detection mode upon completing the calibration procedure.

20 Claims, 12 Drawing Sheets

(56) References Cited

U.S. PATENT DOCUMENTS

| | | | | |
|---|---|---|---|---|
| 2016/0129794 A1* | 5/2016 | Huang | ............... | B60L 11/182 |
| | | | | 320/108 |
| 2016/0178740 A1* | 6/2016 | Sieber | ............... | G01S 13/04 |
| | | | | 342/43 |
| 2016/0341822 A1* | 11/2016 | Wang | ............... | B60L 50/66 |
| 2018/0026482 A1* | 1/2018 | Asano | ............... | H02J 7/00 |
| | | | | 307/104 |
| 2018/0287432 A1* | 10/2018 | Wang | ............... | H02J 50/60 |

\* cited by examiner

WIRELESS CHARGING TRANSMITTER WITH FOREIGN OBJECT AND LIVING OBJECT DETECTION SYSTEMS

CROSS-REFERENCE TO RELATED APPLICATIONS

This application is a continuation of U.S. patent application Ser. No. 15/602,565, filed May 23, 2017, entitled "Wireless Charging Transmitter with Foreign Object and Living Object Detection Systems," the entire contents of which is hereby incorporated herein by reference.

FIELD

This application is generally related to wireless power charging of chargeable devices such as electric vehicles, and more specifically to systems and methods for detecting foreign objects in the charging path.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a wireless field). Some such systems may provide wireless power to the vehicle while the vehicle is located on the roadway, in motion or stationary. Object detection systems such as Living Object Protection (LOP) and Foreign Object Detection (FOD) may be included with a charging system to detect objects disposed within the wireless field. LOP systems generally utilize radio transmissions to detected moving objects, and FOD systems utilize impedance measurements to detect metallic objects in the charging path. Changes in the charging conditions may impact the sensitivity of the object detection systems. Recalibration of the object detection systems may interrupt charging operations. Improvements in object detection methods may reduce the amount of time charging operations are interrupted while improving the sensitivity of the detection systems.

SUMMARY

An example of an apparatus for detecting a presence of a foreign object within a region of a wireless power transfer system according to the disclosure includes a foreign object detection (FOD) system, a living object protection (LOP) system, a control circuit operably coupled to the FOD system and the LOP system, and configured to perform a calibration procedure on the FOD system, operate the LOP system in a high sensitivity mode concurrently with the calibration procedure, and operate the LOP system in a standard detection mode upon completing the calibration procedure.

Implementations of such an apparatus may include one or more of the following features. The FOD system may include a plurality of FOD loops. The calibration procedure may be performed based on a change in one or more power transfer parameters. The one or more power transfer parameters may include a signal noise value on one or more of the plurality of FOD loops. The wireless power transfer system may include an induction coil disposed between the FOD system and the LOP system. The one or more power transfer parameters may include an electric current measurement through the induction coil. The induction coil may be a double-D configuration. The control circuit may be configured to halt the wireless power transfer operation if the LOP system detects an object during the calibration procedure. The FOD system may include 64 FOD loops.

An example of a method of detecting a foreign object on a wireless charging base pad according to the disclosure includes initiating a wireless power transfer between a transmitter and a receiver, such that the transmitter includes a foreign object detection (FOD) system and a living object protection (LOP) system, detecting a change in one or more power transfer parameters, performing a calibration procedure on the FOD system, operating the LOP system in a high sensitivity detection mode concurrently with the calibration procedure, and operating the FOD system and the LOP system in a standard detection mode upon completing the calibration procedure.

Implementations of such a method may include one or more of the following features. The FOD system may include a plurality of FOD loops and detecting the change in the one or more power transfer parameters may include detecting a signal noise value on one or more of the plurality of FOD loops. The transmitter may include an induction coil and the one or more power transfer parameters may include an electric current measurement through the induction coil. A start-up calibration procedure may be performed on the FOD system prior to initiating the wireless power transfer, and the LOP system may operate in the high sensitivity detection mode concurrently with the start-up calibration procedure. An alarm may be generated if an object is detected by the LOP system operating in the standard detection mode. The wireless power transfer may be halted if an object is detected by the FOD system operating in the standard detection mode. The wireless power transfer may be halted if an object is detected by the LOP system operating in the high sensitivity detection mode. The wireless power transfer may be halted in high sensitivity mode and in standard detection mode. In standard detection mode, the wireless power transfer may be resumed if the LOP system indicates that the charging area is clear of LOP objects.

An example of an apparatus for detecting a foreign object on a wireless charging base pad according to the disclosure includes means for initiating a wireless power transfer between a transmitter and a receiver, such that the transmitter includes a foreign object detection (FOD) system and a living object protection (LOP) system, means for detecting a change in one or more power transfer parameters, means for performing a calibration procedure on the FOD system, means for operating the LOP system in a high sensitivity detection mode concurrently with the calibration procedure, means for operating the FOD system and the LOP system in a standard detection mode upon completing the calibration procedure.

An example of a non-transitory processor-readable storage medium comprising processor-readable instructions configured to cause one or more processors to detect a foreign object on a wireless charging base pad according to the disclosure includes code for initiating a wireless power transfer between a transmitter and a receiver, such that the transmitter includes a foreign object detection (FOD) system and a living object protection (LOP) system, code for detecting a change in one or more power transfer parameters, code for performing a calibration procedure on the FOD system, code for operating the LOP system in a high sensitivity detection mode concurrently with the calibration procedure, and code for operating the FOD system and the LOP system in a standard detection mode upon completing the calibration procedure.

Implementations of such a storage medium may include one or more of the following features. The FOD system may include a plurality of FOD loops and the code for detecting the change in the one or more power transfer parameters may include code for detecting a signal noise value on one or more of the plurality of FOD loops. The transmitter may include an induction coil and the one or more power transfer parameters may include an electric current measurement through the induction coil. The storage medium may also include code for performing a start-up calibration procedure on the FOD system prior to initiating the wireless power transfer, and code for operating the LOP system in the high sensitivity detection mode concurrently with the start-up calibration procedure. Code for generating an alarm if an object is detected by the LOP system operating in the standard detection mode. Code for halting the wireless power transfer if an object is detected by the FOD system operating in the standard detection mode. Code for halting the wireless power transfer if an object is detected by the LOP system operating in the high sensitivity detection mode. Code for resuming the wireless power transfer if an object is detected by the LOP system operating in the standard detection mode.

Items and/or techniques described herein may provide one or more of the following capabilities, as well as other capabilities not mentioned. A wireless power transmitter may execute a wireless power transfer with a receiver. A foreign object detection FOD system may be disposed between the transmitter and the receiver. The FOD system may be configured to detect metallic objects. A living object protection (LOP) system may be configured to detect moving objects near the transmitter. The LOP system is configured to operate in a standard detection mode and a high sensitivity detection mode. The FOD system may be calibrated prior to and during wireless power transfer operations. The LOP system may be configured to operate in a high sensitivity detection mode when the FOD system is being calibrated. Wireless power transfer may be interrupted if an object is detected by the LOP system during the FOD calibration process. The LOP system may resume standard detection mode when the FOD calibration process is completed. When the FOD system and the LOP system are operating in standard detection mode, objects detected by the LOP system may trigger an alert message. The LOP system may be used to restart the charge process automatically. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
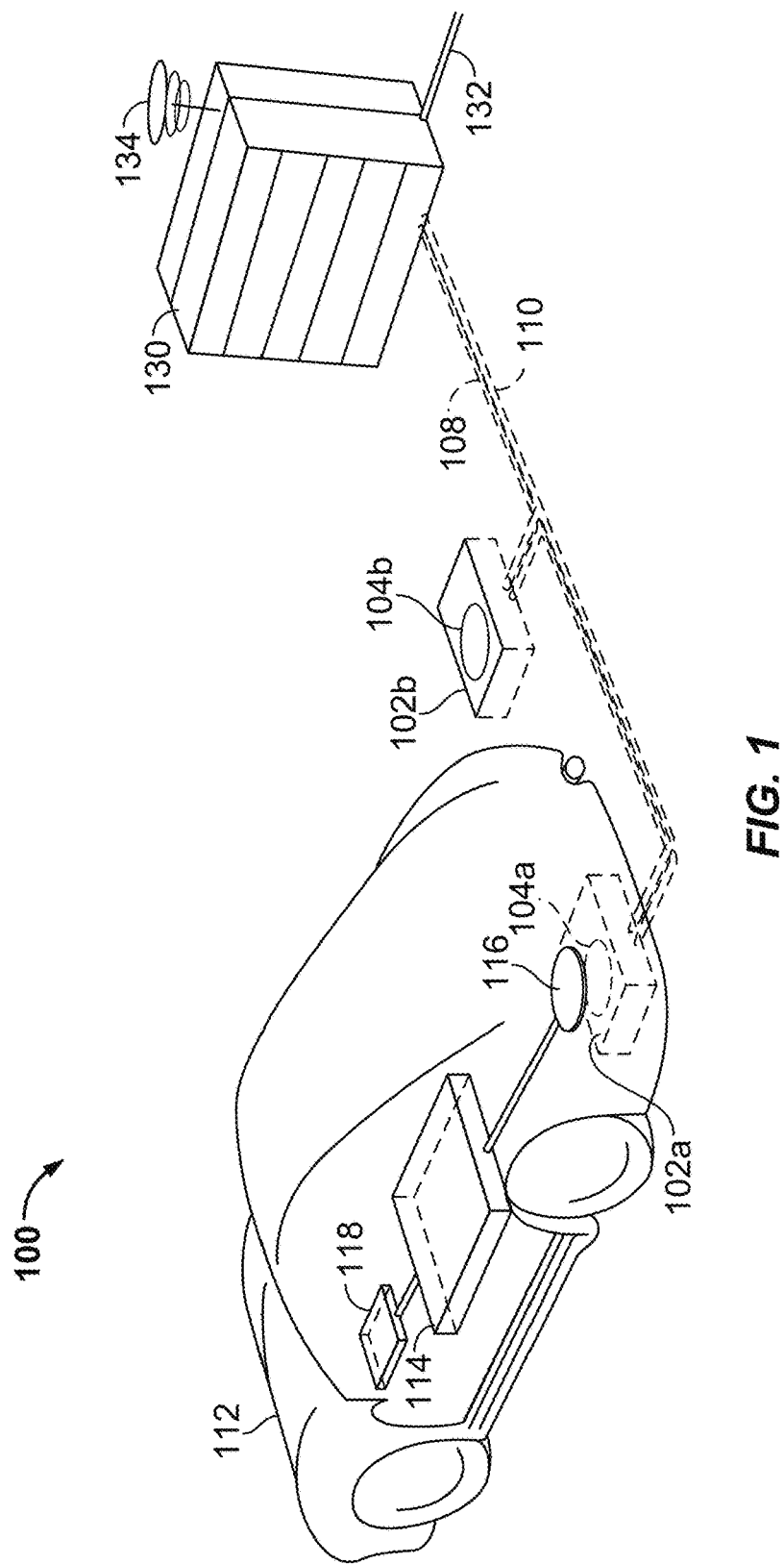
FIG. 1 is a diagram of an exemplary wireless power transfer system for charging an electric vehicle.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

In wireless charging systems, Living Object Protection (LOP) and Foreign Object Detection (FOD) systems are utilized to protect the physical power transfer process. A FOD system is configured to detect metallic objects in the charging area and a LOP system is configured to detect non-metallic objects (e.g., humans or animals) which may move into a protection area around the charging area. A FOD system should be capable of detecting metallic objects of small sizes (e.g., the size of coin or a paperclip). To meet such requirements, the FOD system may be configured to operate in highly adapted runtime modes (e.g. with runtime sensitivity calibrations such as optimized selections of frequencies for an array of detection coils). This sensitivity calibration sporadically requires a system reset, which may temporarily degrade the operation of the FOD system. Specifically, during the few seconds required for the reset, FOD detection cannot be guaranteed. These detection gaps (e.g., blind spots) may impede the safe operation of the charging system by allowing the formation of a potentially hazardous operating situation. For example, an object may be introduced to the charging path during the calibration gap and remain undetected. The flux generated during the charging operation may cause such an undetected object to heat up and potentially damage the charging pad, burn a user, or start a fire.

LOP sensors are typically implemented as radar sensors, looking for entering and exiting events into and from the charging area (i.e., referred to as the Z-gap). Though an LOP system is typically looking for objects that may be slightly larger than a paperclip, they may be configured to operate on higher sensitivity settings extending the probability to detect such smaller FOD objects.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer. Foreign objects disposed within the wireless field may degrade the power transfer and/or create safety issues due to heat generated within the foreign object.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Referring to FIG. 1, a diagram of an exemplary wireless power transfer system 100 for charging an electric vehicle 112 is shown. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. The second wireless charging system 102b includes a second base system induction coil 104b. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below. Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians. A potential safety issue, however, may arise when metallic foreign objects are located in the near-field generated by the base system induction coil 104*a* or the vehicle induction coil 116 (e.g., in a V2G configuration). The magnetic energy in the near-field may be transformed into thermal energy within a metallic foreign object, thus creating a fire hazard.

Figure 2:
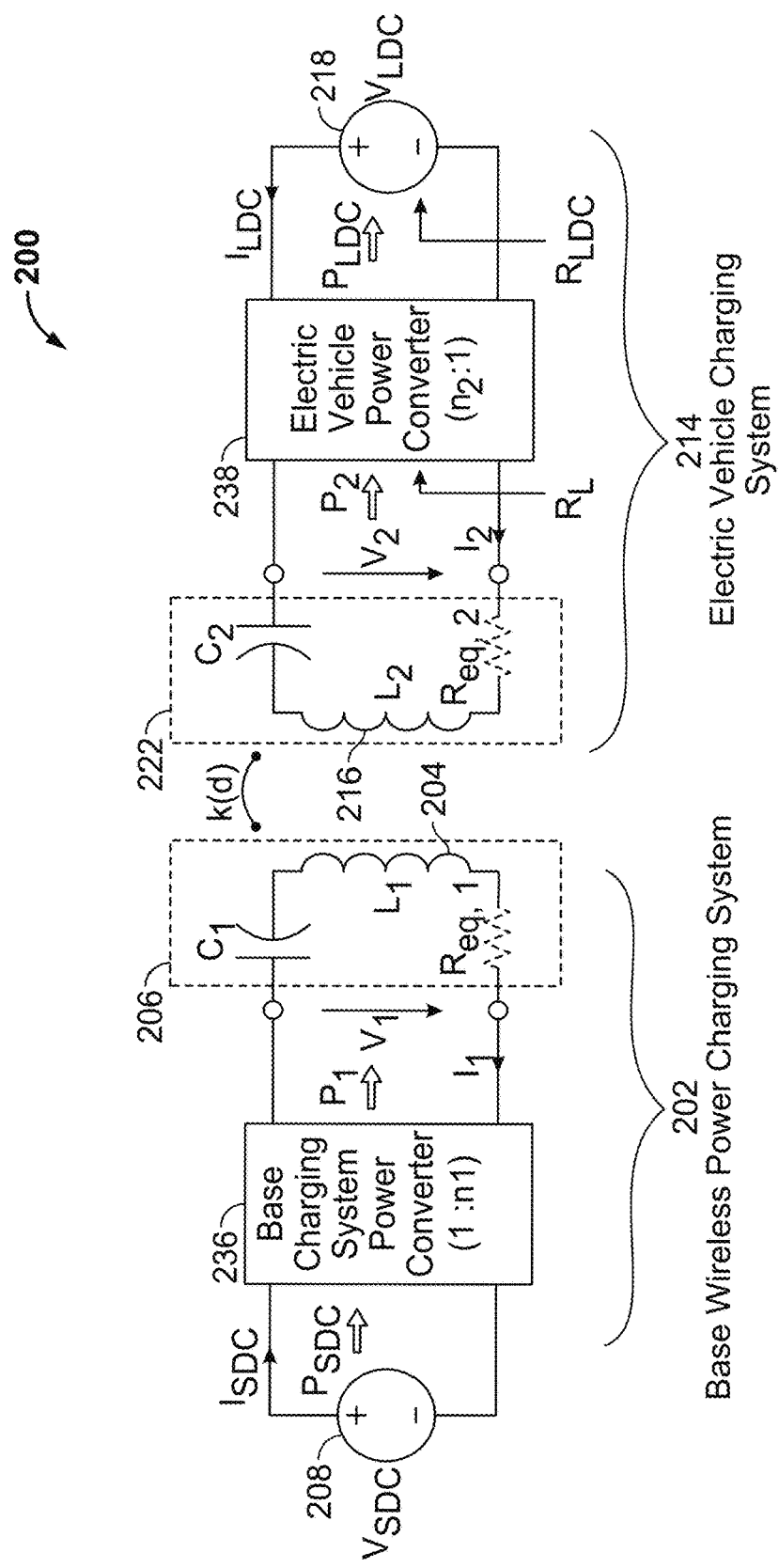
FIG. 2 is a schematic diagram of exemplary core components of the wireless power transfer system of FIG. 1.

Referring to FIG. 2, a schematic diagram of exemplary core components of the wireless power transfer system 100 of FIG. 1 is shown. The wireless power transfer system 200 may include a base system transmit circuit 206 including a base system induction coil 204 having an inductance $L1$. The wireless power transfer system 200 further includes an electric vehicle receive circuit 222 including an electric vehicle induction coil 216 having an inductance $L2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102*a*.

A power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power P1 to the base system transmit circuit 206 including the capacitor C1 in series with the base system induction coil 204 to emit an electromagnetic field at a desired frequency. The capacitor C1 may be provided to form a resonant circuit with the base system induction coil 204 that resonates at a desired frequency. The base system induction coil 204 receives the power P1 and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor C2 and electric vehicle induction coil 116. The capacitor C2 may be provided to form a resonant circuit with the electric vehicle induction coil 216 that resonates at a desired frequency. Element k(d) represents the mutual coupling coefficient resulting at coil separation. Equivalent resistances Req,1 and Req,2 represent the losses that may be inherent to the induction coils and 216 and the anti-reactance capacitors C1 and C2. The electric vehicle receive circuit 222 including the electric vehicle induction coil 316 and capacitor C2 receives power P2 and provides the power P2 to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power PLDC to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102*a* (acting as a transmitter), which may be used to "cloak" the electric vehicle wireless charging system 114 (acting as the receiver) from the base wireless charging system 102*a*. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling. The coils may be litz wire.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. Inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high native quality (Q) factor to lower the losses of the induction coil and to increase efficiency of the inductive coupling system.

Figure 3:
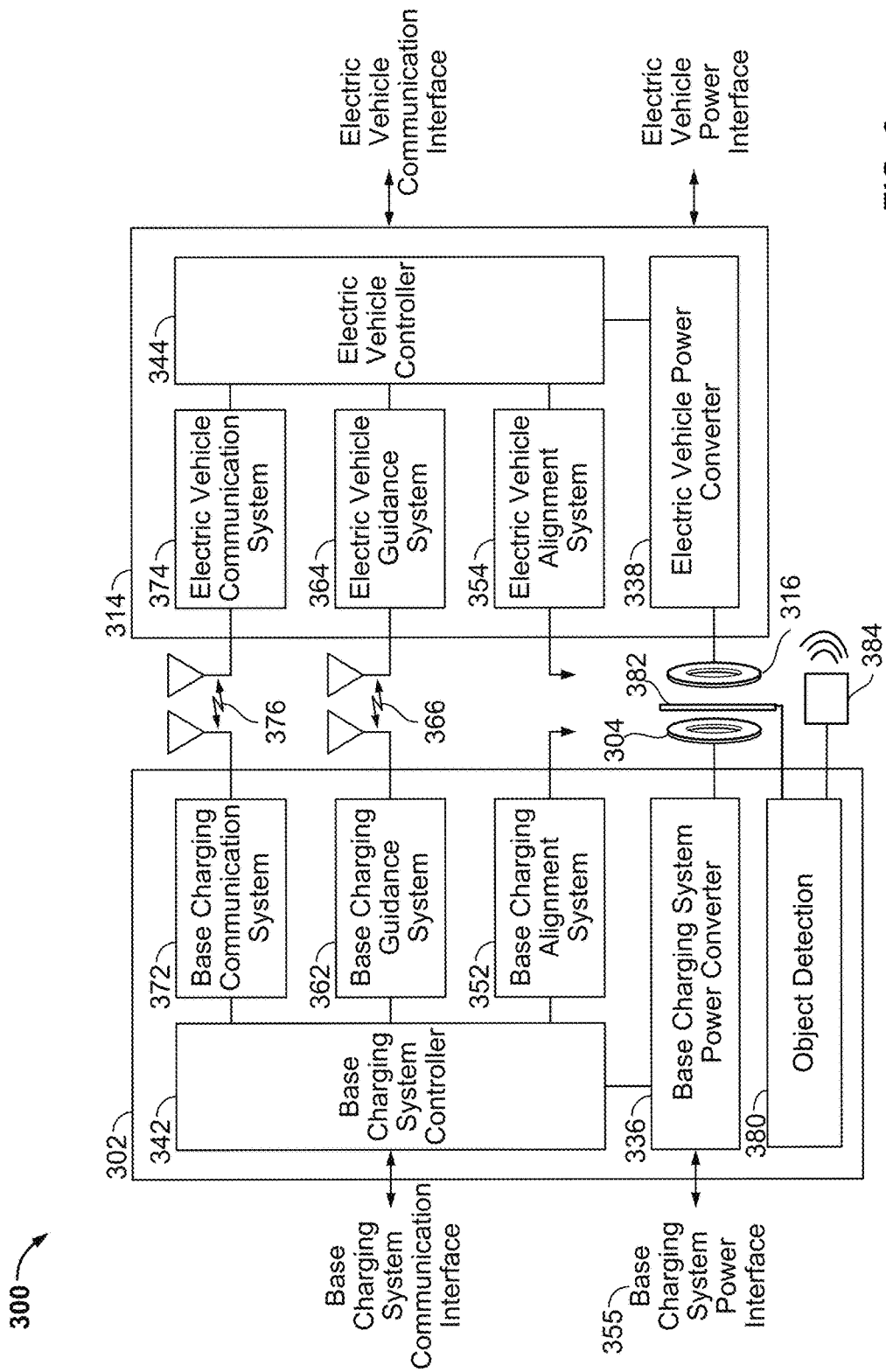
FIG. 3 is another functional block diagram showing exemplary core and ancillary components of the wireless power transfer system of FIG. 1.

Referring to FIG. 3, another functional block diagram showing exemplary core and ancillary components of the wireless power transfer system 300 of FIG. 1 is shown. The wireless power transfer system 300 illustrates a object detection controller 380, a communication link 376, a guidance link 366, and alignment systems 352, 354 for the base system induction coil 304 and electric vehicle induction coil 316. In an example, the power transfer system 300 may include a pairing device (not shown in FIG. 3) to certify the matching of the transmitting entity and the receiving entity of alignment and guidance. As described above with reference to FIG. 2, and assuming energy flow towards the electric vehicle 112, in FIG. 3 a base charging system power interface 355 may be configured to provide power to a base charging system power converter 336 from a power source, such as an AC or DC power supply. The base charging system power converter 336 may receive AC or DC power from the base charging system power interface 355 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. The base charging system controller 342 may be operably coupled to an object detection controller 380 configured to control a foreign object detection (FOD) system 382 and a living object protection (LOP) system 384. In addition, there may be separate general-purpose communication links (e.g., channels) supported by base charging communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, foreign object detection, living object protection information, as well as maintenance and diagnostic data for the electric vehicle 112. The base charging system controller may also have a Human Machine Interface (HMI) to receive input from a user such as an indication that the charging area is free from foreign objects. An emergency off button may also be part of the interface. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle wireless charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 includes detection and sensor systems for use with systems to properly guide the driver or the vehicle to the charging spot and sensors to mutually align the induction coils with the required separation/coupling. The LOP system 384 includes sensors to detect objects that may obstruct the electric vehicle induction coil 316 from moving to a particular height and/or position to achieve coupling, and safety sensors for use with systems to perform a reliable, damage free, and safe operation of the system. For example, the LOP system 384 may include a sensor for detection of presence of animals or children approaching the wireless power induction coils 104a, 116 beyond a safety radius. The FOD system 382 is configured to detect foreign metal objects near the base system induction coil 304 that may be heated up (induction heating). Other sensors may be used for the detection of hazardous events such as incandescent objects on the base system induction coil 304, and temperature monitoring of the base wireless charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-150 kHz and particularly in the range from 80-90 kHz. This low frequency coupling may allow highly efficient power conversion that may be achieved using solid state devices. In addition, there may be less coexistence issues with radio systems compared to other bands.

Figure 4:
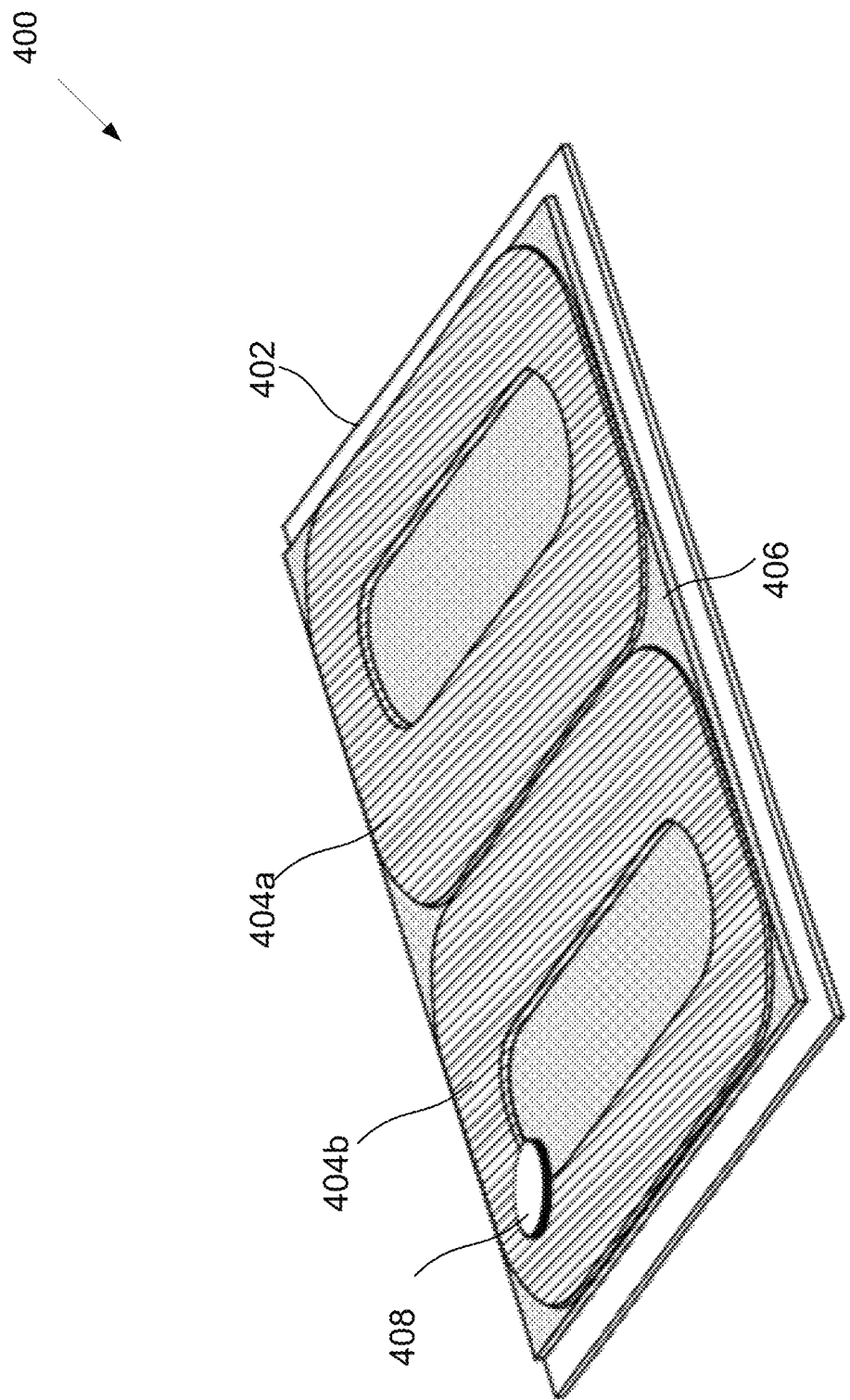
FIG. 4 is a perspective illustration of a magnetic flux device with a foreign object.

Referring to FIG. 4, with further reference to FIG. 3, a perspective illustration 400 of a magnetic flux device 402 with a foreign object 408 is shown. As an example, the magnetic flux device 402 is configured as a double-D, full-size coil with a ferrite layer configured to transmit or receive magnetic flux to or from a space beyond the magnetic flux device. The double-D configuration is exemplary only and not a limitation as other configurations such as circular, bi-polar, and solenoid type may be used. As used herein, the term "magnetic flux device" has its broadest reasonable interpretation, including but not limited to, a base pad (e.g., base system induction coil 304), a vehicle pad, or other type of magnetic flux pad, and is not restricted to any particular shape, dimensions, or combination of components. As used herein, the term "pad" has its broadest reasonable interpretation, including but not limited to, a device (e.g., a base pad, a vehicle pad) configured for use in a wireless electric vehicle charging system, and is not restricted to any particular shape, dimensions, or combination of components. The magnetic flux device 402 comprises at least a first electrically conductive coil 404a and a second electrically conductive coil 404b. The first and second coils 404a-b may be wound litz wire or other conductive material. The first coil 404a is substantially planar and has a first periphery bounding a first area. The second coil 404b is substantially planar and has a second periphery bounding a second area. The second coil 404b is substantially coplanar with the first coil 404a. The magnetic flux device 402 further comprises a magnetically permeable material 406 having a substantially planar surface and having a third periphery bounding a third area. The magnetically permeable material 406 is sometimes referred to herein as a "core." As used herein, the term "core" has its broadest reasonable interpretation, which in particular, is not to limited to being in a central location or being wrapped around by other components. The magnetically permeable material 406 can be magnetically associated with at least the first coil 404a and the second coil 404b. The first coil 404a and the second coil 404b are substantially parallel to the substantially planar surface. A ratio of a sum of the first area and the second area to the third area is in a range between 0.9 and 1.1. The magnetic flux device 402 may be enclosed in an insulating shell (not shown) to provide electrical isolation and protection from the environment. A foreign object 408 is located within the area of magnetic flux transmitted by the magnetic flux device 402. The foreign object 408 represents any metallic object such as coins, nuts, bolts, washers, beverage cans, or any other metallic object that may be found in proximity to the magnetic flux device 402 and creating a potential safety hazard due to induction heating of the foreign object.

Figure 5:
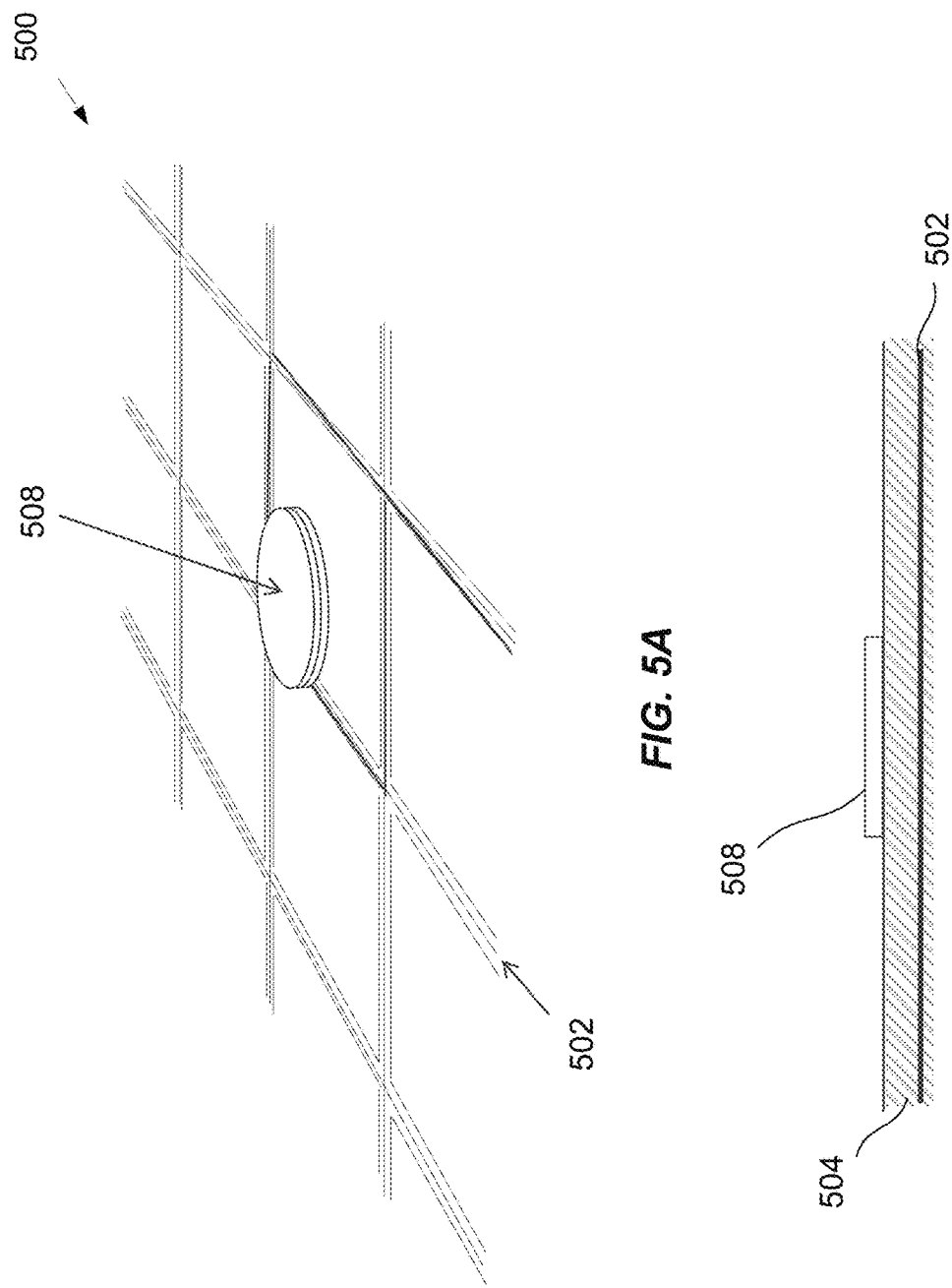
FIGS. 5A and 5B are perspective illustrations of an example foreign object detection (FOD) array.

Referring to FIGS. 5A and 5B, perspective illustrations of an example foreign object (FOD) array 500 are shown. The array 500 includes a plurality of conductive wire loops 502. A foreign object 508 is disposed above the array 500. The array 500 may be disposed above a magnetic flux device 402 such as the base inductor 304. For example, referring to FIG. 5B, the loops 502 may be enclosed in a non-conductive housing 504 and the foreign object 508 may be located on the exterior of the housing 504. As an example, the distance between the loops 502 and the foreign object may be between 1 and 10 mm. In operation, loops 502 in the array 500 are a collection of small metal detectors. The presence of a metallic object near the loops 502 changes the impedance of the loops. The change in impedance may be measured and evaluated. In an example Wireless Electric Vehicle Charging (WEVC) base pad, the array 500 includes 64 loops divided into 4 subsystems (i.e., 16 loops per subsection). The loops 502 may have an operating frequency of 2.5-3.5 MHz based on a wireless power transfer frequency of 80-90 kHz. Other loop frequencies may be used to provide adequate separation from the power transfer frequency. The object detection controller 380 may be configured to evaluate each subsection 6.25 time per second. Other sampling frequencies may also be used. During charging operations, the electric vehicle controller 344 may reduce the amount of power required based on the charge state of the vehicle battery system. The reduction in power may change the current in the base inductor 304 and may impact the sensitivity of the loops 502. To compensate for the changes in wireless power transfer, the object detection controller 380 is configured to perform a calibration procedure on the array 500. During the calibration procedure, however, the FOD array 500 may be blind to any metallic objects that appear while the calibration is executing. The wireless power transfer between the base pad and the vehicle may cause such an undetected metallic object to heat up. A heated metal object may damage the insulation on the base pad, start a fire, create a burn hazard, or any combination of such dangers.

Figure 6:
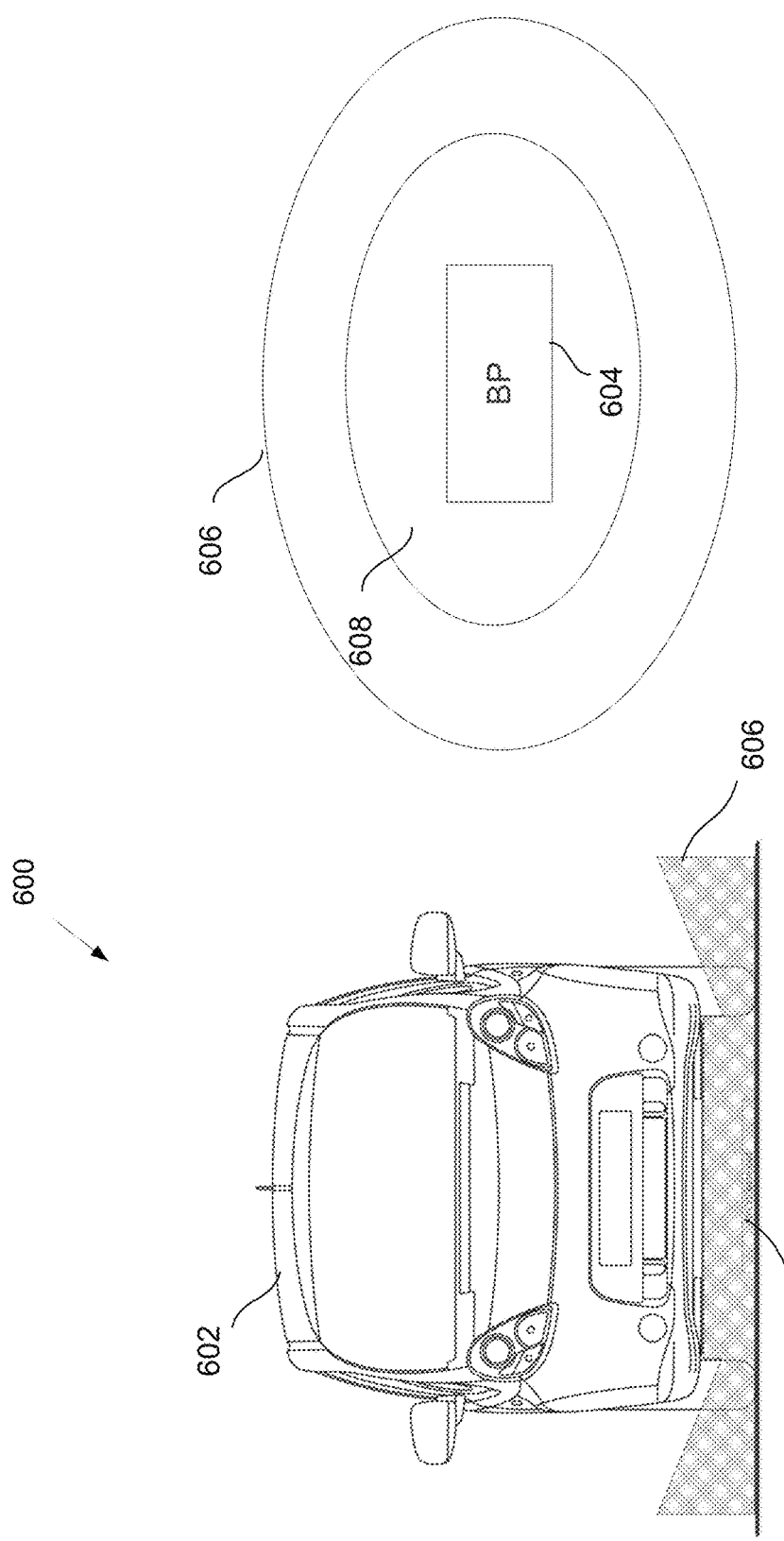
FIGS. 6A and 6B are conceptual diagrams of a living object protection (LOP) system coverage area.

Referring to FIGS. 6A and 6B, conceptual diagrams of a living object protection (LOP) system 600 coverage area are shown. The LOP system 600 is an example of the LOP system 384 and is operably coupled to the object detection controller 380. The LOP system 600 is included within a base pad 604 and is configured to detect moving objects within in a detection area 606 under a vehicle 602. In an example, the detection area 606 extends approximately 1 meter (e.g., +/−20 cm) from the edge of the base pad 604. The LOP system 600 may be a Ultra Wide Band (UWB) radar technology, operating at frequencies between 6.1 GHz and 8.5 GHz. The LOP system 600 may be configured to detect small moving objects (e.g., a small as a paper clip), in a speed rage of 0.08 m/s to 5 m/s. The LOP system 600 may include multiple sensitivity modes such as a standard sensitivity mode and a high sensitivity mode. The change in sensitivity may be based on sampling frequency, transmitter power, or signal to noise processing. In an example, a high sensitivity mode lowers the noise threshold to detect objects with smaller return signal. An observation area 608 may be an area within the detection area 606. In operation, the LOP system 600 is configured to detect and monitor targets within the detection area 606 and then raise an alarm when the target enters the observation area 608. The size of the observation area can be configurable based on WEVC system requirements.

Figure 7:
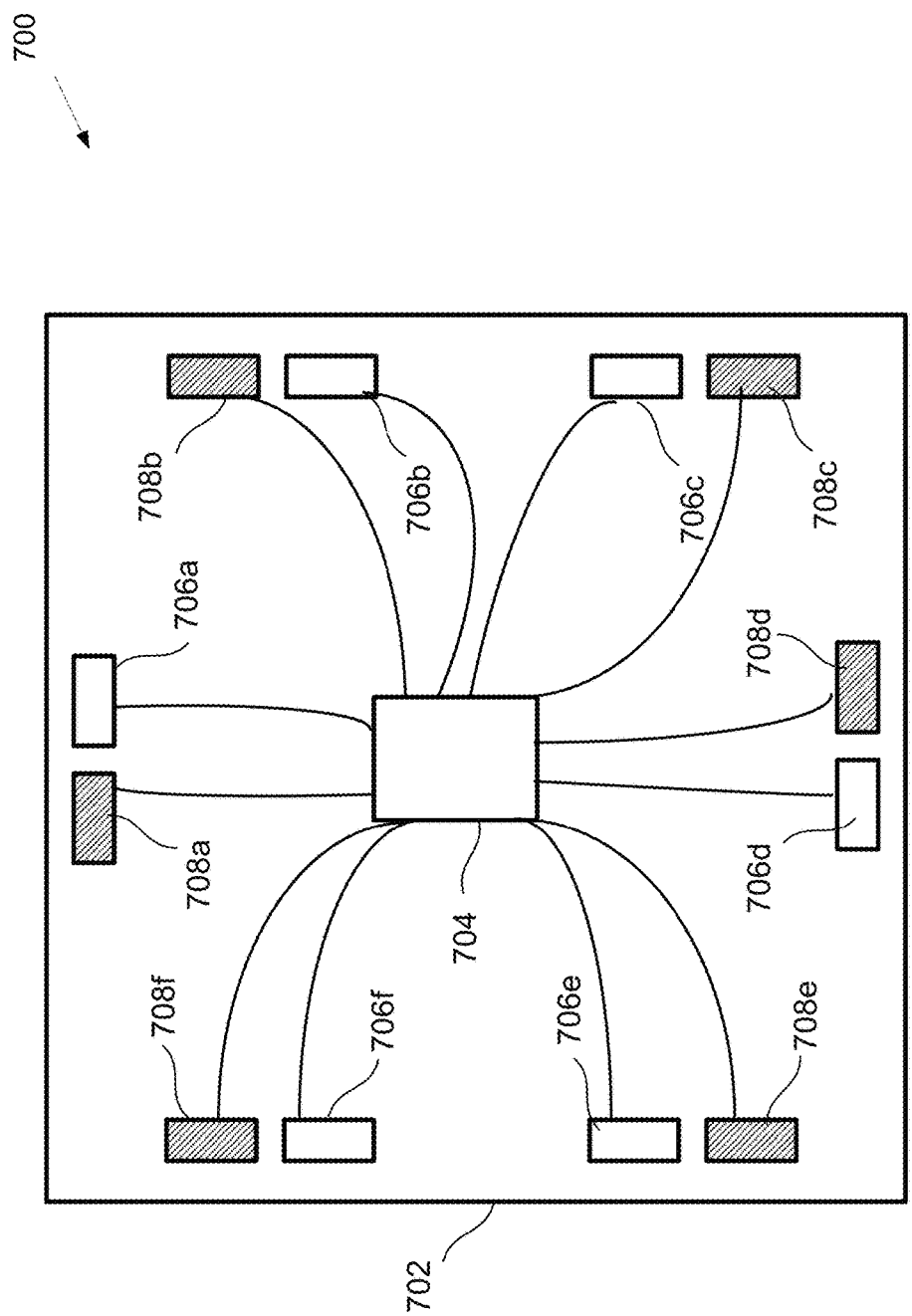
FIG. 7 is a block diagram of a LOP system.

Referring to FIG. 7, a block diagram of an example LOP system 700 is shown. The LOP system 700 may be integrated with a magnetic flux device 402. The LOP system 700 includes a mounting surface 702, a radar module 704, a plurality of receive elements 706a-f, and a plurality of transmit elements 708a-f. The radar module 704 is operably coupled to each of the receive elements 706a-f and the transmit elements 708a-f. In an example, the mounting surface 702 may be a bottom cover of a base pad assembly and the transmit and receive elements may be integrated into the sides of the base pad assembly. The radar module 704 may include one or more processors configured to utilize UWB technology. The radar module 704 may be configured to utilize time division multiplexing (TDM) for transmit and receive element pairs (e.g., 706a-f, 708a-f). Pairs of antennas may transmit simultaneously such that the corresponding receive antennas are directed away from the other transmitter (e.g., 706d, 708d and 706f, 708f are an example of such a pair). The measurements from each of the transmit and receive elements may be combined to provide an aggregate detection area (e.g., the detection area 606). The radar module 704 may be operably coupled to the object detection controller 380 and may communicate via established protocols (e.g., Controller Area Network (CAN)). Other communication protocols and radar module may also be configured to provide object motion information to the base wireless charging system 302.

Figure 8:
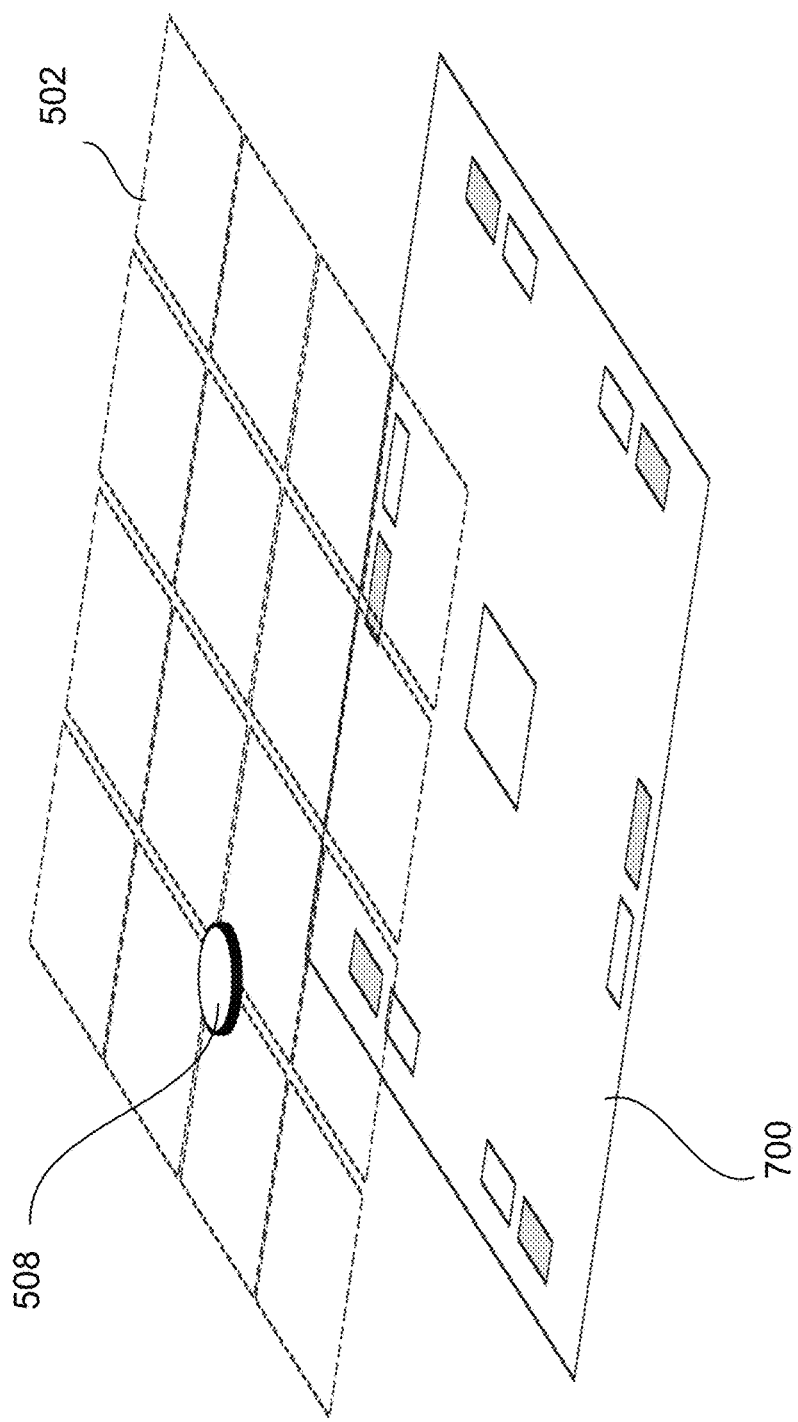
FIG. 8 is a perspective diagram of an example FOD array with a LOP system.

Referring to FIG. 8, with further reference to FIGS. 5A and 7, a perspective diagram of an example FOD array 502 with a LOP system 700 is shown. The arrangement of the FOD array 502 and the LOP system 700 in FIG. 8 is exemplary only and not a limitation. In general, the FOD array 502 is located in a position between an induction coil and potential foreign objects. The FOD array 502 and the LOP system may be disposed about a base system induction coil 304 (not shown in FIG. 8). For example, the FOD array 502 and the LOP system 700 may be included into a base pad assembly such that the FOD array is disposed above an induction coil (i.e., closer to a top surface of the base pad assembly) and the LOP system 700 is also disposed within base pad assembly in a location that is below the FOD array 502 (e.g., and below the induction coil). The foreign object 508 is located above the FOD array 502 and may cause a corresponding change (i.e., based on the location) in the impedance of one or more loops in the array. The FOD array 502 and the LOP system 700 are operably coupled to the object detection controller 380 and together provide the ability to detect metal objects in the area proximate to the FOD array 502, and to detect moving objects within 1 meter of the base pad.

Figure 9:
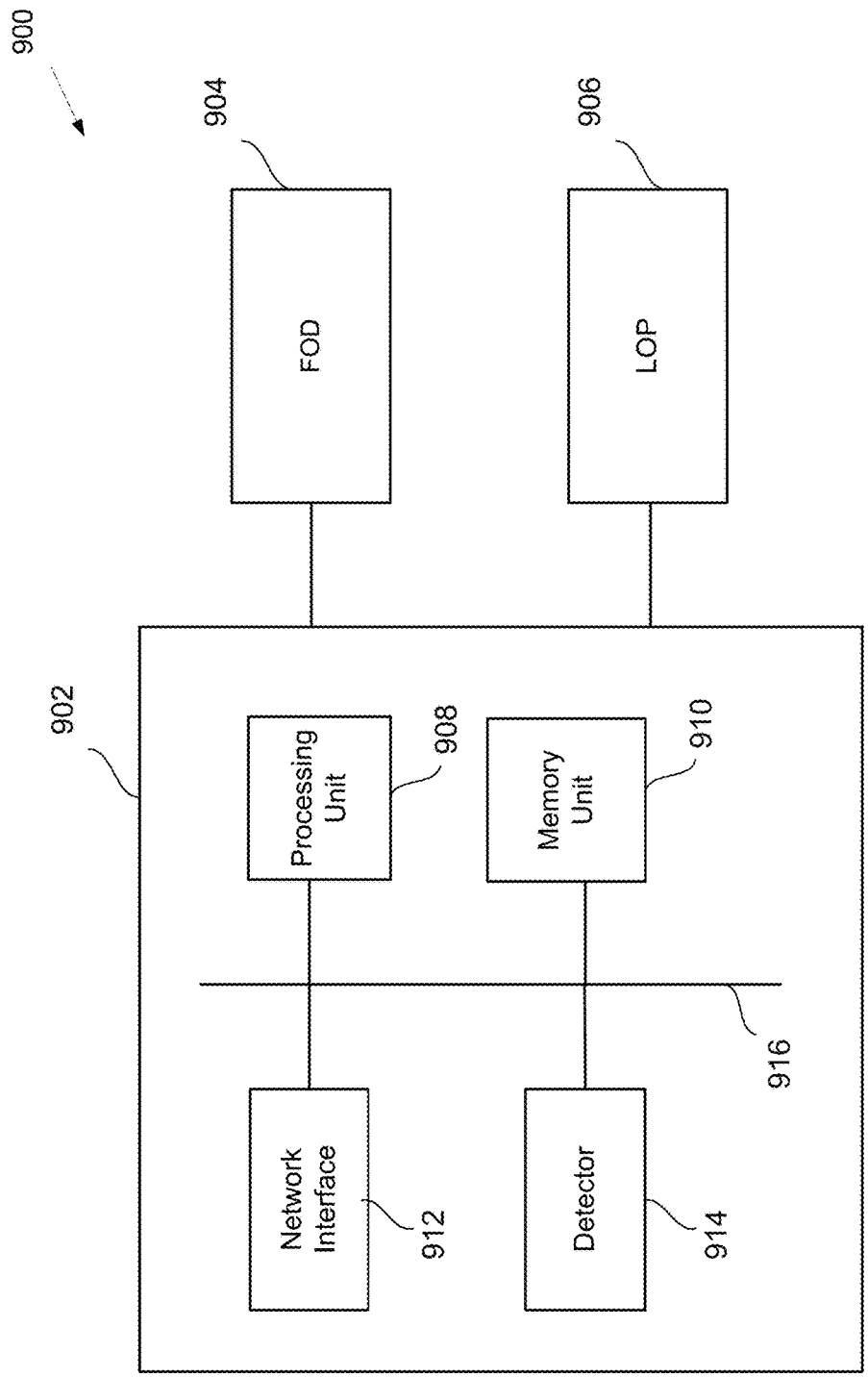
FIG. 9 is a block diagram of an object detection system.

Referring to FIG. 9, a block diagram of an object detection system 900 is shown.

The object detection system 900 includes a control circuit 902, an FOD system 904 and a LOP system 906. The control circuit 902 may be part of the object detection controller 380 (FIG. 3), and may include one or more processors in a processing unit 908, a memory unit 910, a network interface 912, a detector 914 and a bus 916. The processing unit 908 may include multiple processors, multiple cores, multiple nodes, and/or implementing multi-threading, etc. The memory unit 910 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The control circuit 902 may also include a bus 916 (e.g., SPI, I2C, PCI, ISA, PCI-Express, HyperTransport™, InfiniBand™, NuBus, AHB, AXI, etc.), a network interface 912 that may include at least one of a wireless network interface (e.g., a WLAN interface, a Bluetooth™. interface, a WiMAX interface, a ZigBee™. interface, a Wireless USB interface, etc.) and a wired network interface (e.g., an Ethernet interface, etc.). The detector 914 is a means for detecting changes in the electrical characteristics of signal generated by the FOD system and the LOP system 906. Any one of these functionalities may be partially (or entirely) implemented in hardware and/or on the processing unit 908. For example, the functionality may be implemented with an application specific integrated circuit (ASIC), in logic implemented in the processing unit 908, in a co-processor on a peripheral device or card, etc. Further, realizations may include fewer or additional components not illustrated in FIG. 9 (e.g., video cards, audio cards, additional network interfaces, peripheral devices, etc.). The processing unit 908, memory unit 910, network interface 912 and detector 914 may be coupled to the bus 916. Although illustrated as being coupled to the bus 916, the memory unit 910 may be coupled to the processing unit 908. One or more of the elements described in the control circuit 902 may be implemented on a System on Chip (SoC) or in one or more ASICs.

In operation, the object detection system 900 is configured to reduce the potential blind spots/gaps caused by any loss of sensitivity when the FOD system 904 must perform a runtime sensitivity calibration process. In an example, the operation procedure for the object detection system 900 includes operating the FOD system 904 in a traditional detection mode (i.e., a standard detection mode), and providing a signal to the LOP system 906 when a FOD sensitivity calibration process is about to occur. The processing unit 908 may provide instructions to the LOP system 906 to increase the operating state of the LOP system 906 to a high sensitivity mode during the FOD sensitivity calibration process. The high sensitivity mode for the LOP system 906 may also be utilized during the initial FOD calibration process (e.g., when a charging station is initially powered on but before charging operations). If the LOP system 906 detects an object during the FOD sensitivity calibration process, then the control circuit 902 may be configured to halt charging operations and notify a user to inspect the charging area for a foreign object. After receiving an all clear confirmation from the user, the charging operations may continue using standard sensitivity modes for the FOD system 904 and the LOP system 906. In an example, if the LOP system 906 does not detect an object during the FOD sensitivity calibration process, then the FOD system 904 continues to operate in the standard detection mode (i.e., with the new calibration results applied), and the LOP system 906 returns to a standard sensitivity/detection mode.

Figure 10:
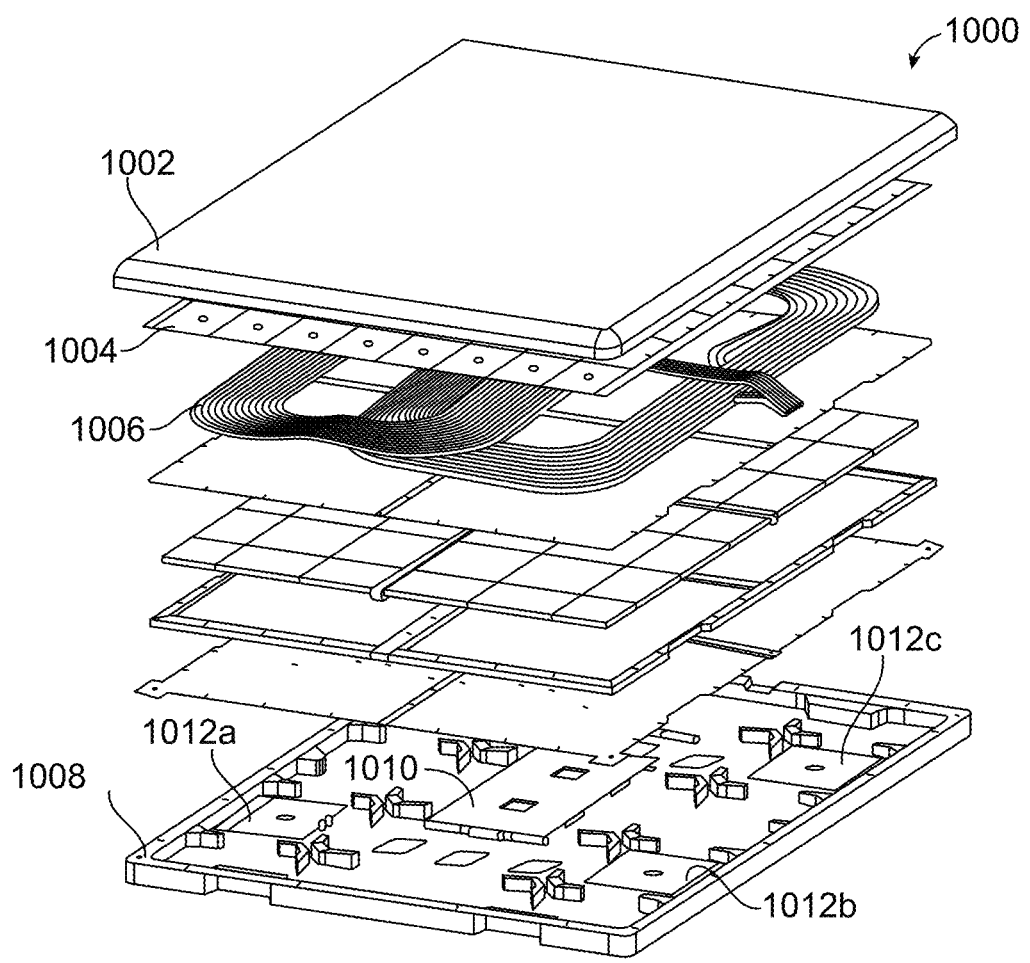
FIG. 10 is an exploded view of an example base pad with a FOD array and a LOP system.

Referring to FIG. 10, an exploded view of an example wireless charging base pad 1000 with a FOD array 1004 and a LOP system is shown. The base pad 1000 is exemplary only and not a limitation as other charging pad configurations with a FOD array and LOP system may be used. The relevant assemblies in the base pad 1000 include a top cover assembly 1002, the FOD array 1004, an induction coil 1006, a bottom cover assembly 1008 including a radar module 1010 and a plurality of transmitter/receiver units 1012a-c (e.g., including a transmit and receive element pair 706a, 708a). The top cover assembly 1002 is constructed of a durable non-conductive material (e.g., high-impact plastic) and is configured to protect the base pad assemblies from the environment and other external elements. The FOD array 1004 may include a plurality of FOD loops (e.g., 64 loops) arranged in plurality of subgroups (e.g., four subgroups of 16 FOD loops each). The induction coil 1006 is a double-D configuration coil including two overlapping loops of litz wire. The double-D configuration is exemplary only as other induction coil configurations such as circular coils, bi-polar coils, solenoid coils, other double-D configures, etc. may also be used. The bottom cover assembly 1008 may be constructed of a durable non-conductive material and may include side walls configured to mate with the top cover assembly 1002 such that the top and bottom covers form a protective shell around the base pad assemblies. The bottom cover assembly 1008 may also be configured as a mounting assembly for the LOP system components including the radar module 1010 and the transmitter/receiver units 1012a-c. In an example, the transmitter/receiver units 1012a-c may be disposed in the side walls of the bottom cover assembly 1008. The base pad 1000 is operably coupled to base wireless charging system 302. For example, the base charging system power converter 336 is configured to provide a signal to the induction coil 1006, and the object detection controller 380 is coupled to the FOD array 1004 and the LOP system (e.g., the radar module 1010).

Figure 11:
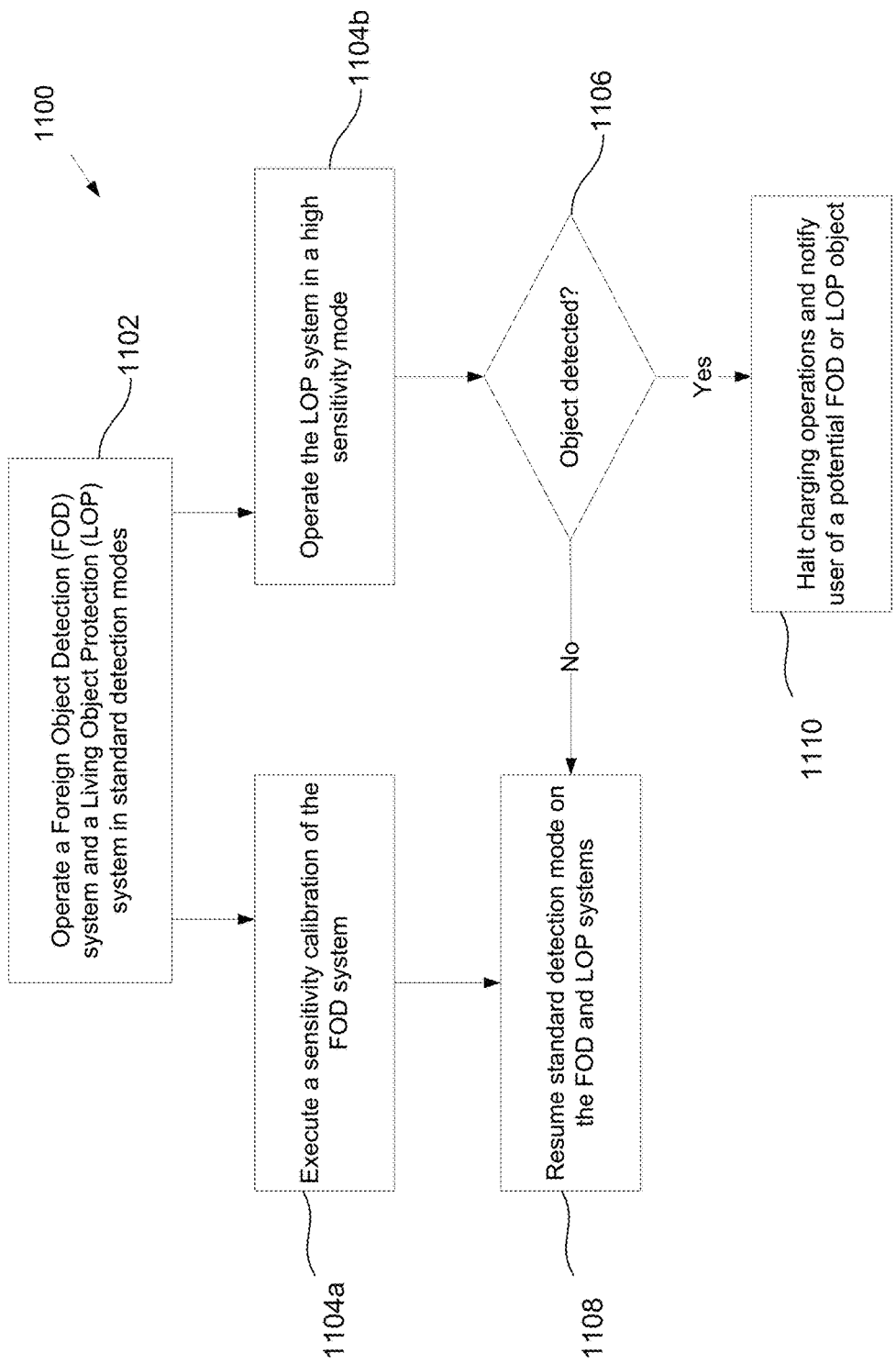
FIG. 11 is a process diagram for halting charging operations during FOD system calibration.

Referring to FIG. 11, with further reference to FIG. 3 a method 1100 for halting charging operations during FOD system calibration includes the stages shown. The method 1100, however, is exemplary only and not limiting. The method 1100 may be altered, e.g., by having stages added, removed, or rearranged.

At stage 1102, the method includes operating a Foreign Object Detection (FOD) system and a Living Object Protection (LOP) system in standard detection modes. The base wireless charging system 302 is configured to provide a wireless power transfer to the electric vehicle charging system 314. Prior to commencing the power transfer, and during the power transfer, the object detection controller 380 is configured to monitor the impedance of the FOD system 382 and the radar return signal from the LOP system 384. In a standard detection mode, the FOD system may operate at a frequency of 2.5-3.5 MHz and monitor the reactance of the FOD loops to detect the presence of a foreign metallic object. The object detection controller 380 may include a control circuit 902 with a detector 914 configured to compare the impedance measurement with a threshold value. A variation of the detected impedance value on one or more of the FOD loops may be used to determine the presence of a metallic object. The object detection controller 380 is configured to initiate a calibration procedure for the FOD system 382 based on system parameters such as time, battery charge state, and impedance measurements. Other periodic or event based triggers may also be used to initiate a calibration procedure.

At stage 1104a, the method includes executing a sensitivity calibration of the FOD system. The object detection controller 380 may initiate the sensitivity calibration based on the noise induced on the FOD loops by the induction coil 304. For example, the current requirements to charge the battery (i.e., the electric load) in the electric vehicle charging system 314 may vary based on the battery charge state. The change in current requirements may impact the pattern of the magnetic flux between the base system induction coil 304 and the vehicle induction coil 316. The change in magnetic flux may impact the sensitivity of the FOD system 382. During the FOD sensitivity calibration, the object detection controller 380 may be configured to sweep through the operating frequencies of the FOD system (e.g. 2.5-3.5 MHz) to find a frequency with a relative noise minimum. The calibration may be performed on the FOD loops individually or multiple loops in different subsets may be calibrated simultaneously. The FOD loop sensitivity calibration procedure may take a few seconds to complete (e.g., 2, 4, 8 16 seconds). During the calibration procedure, the FOD system 382 may be blind to metallic objects which may potentially fall on the base pad.

At stage 1104b, the method includes operating a living object protection (LOP) system in a high sensitivity mode. The object detection controller 380 may operate the LOP system 384 in the high sensitivity mode concurrently (or prior to) the FOD calibration process at stage 1104a. The higher sensitivity of the LOP system 384 may help compensate for the lack of sensitivity in the FOD system 382 during the calibration procedure. The LOP high sensitivity mode may include changes in one or more filtering parameters within the object detection controller 380 based on the system noise levels. For example, the LOP system 384 may be configured to operate at a first noise threshold during normal operations and a second noise threshold during high sensitivity operations (i.e., such that the second threshold is lower than the first threshold).

At stage 1106, the method includes determining if an object is detected. The object detection controller 380 is configured to determine if the LOP system 384, while operating in high sensitivity mode, detects an object. For example, object detection is based on a return signal exceeding the second threshold described above. As an example, the LOP system 384 may be operating at a frequency of 6.68 GHz, and may be configured to detect moving objects the size of a paper clip while in high sensitivity mode. The frequency and object detection size are exemplary only, and not a limitation. Detection resolution may vary based on base pad design and the corresponding radar module.

At stage 1108, the method includes resuming standard detection mode on the FOD and the LOP systems if an object is not detected. The object detection controller 380 is configured to determine that the FOD system 382 completed the sensitivity calibration executed at stage 1104a. The FOD system 382 resumes operation in the standard detection mode with any new calibration settings determined at stage 1104a. With the FOD system 382 in a standard detection mode, the LOP system 384 may return to the standard detection mode. The method may continue until the object detection controller 380 determines that the FOD system 382 requires another sensitivity calibration.

At stage 1110, the method includes halting charging operations and notifying a user of a potential FOD or LOP object if an object is detected by the LOP system. The base wireless charging system 302 may be a means for generating an alarm to an HMI. The object detection controller 380 is configured to instruct the base wireless charging system 302 to deactivate the wireless power transfer and send an alarm to a user. The base charging system power converter 336 may be a means for halting the charging operations. The user alarm may include a message to prompt the user to visually inspect the base pad for any foreign objects. The user may be required to enter a prompt to indicate that the base pad is clear before charging may be resumed. Interrupting the charging operations based on the signal from the LOP system 384 is an effort to reduce the potential of a foreign metal object being disposed on the base pad while the pad is energized. As previously indicated, conductive objects in the magnetic flux may be heated to the point of causing a burn risk or potentially starting a fire. Once the user confirms the base pad is clear, the object detection controller 380 may be configured to perform a FOD system initialization/calibration procedure and then resume charging operations.

Figure 12:
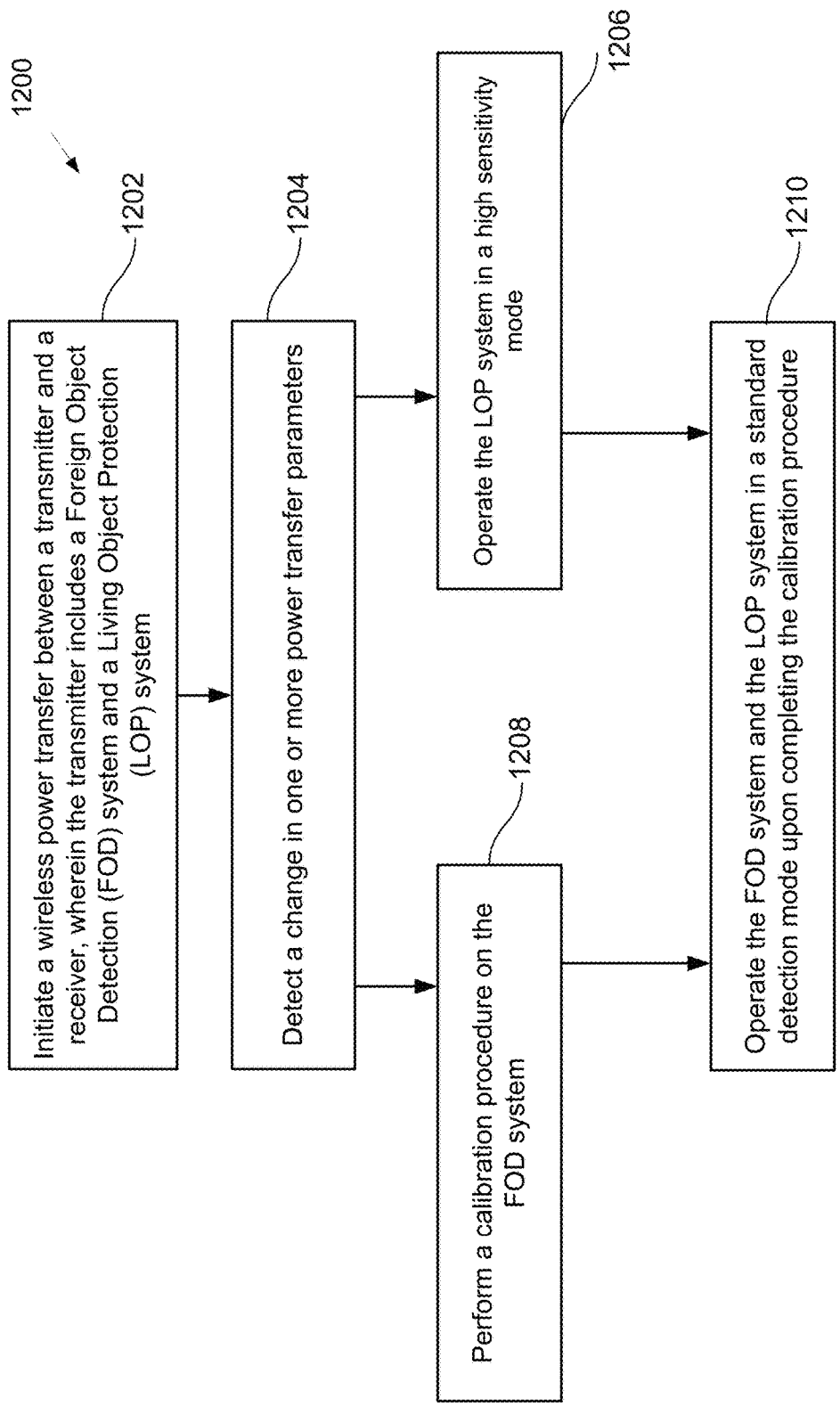
FIG. 12 is a process diagram for executing a FOD calibration process.

Referring to FIG. 12, with further reference to FIG. 3 a method 1200 for executing a FOD system calibration process includes the stages shown. The method 1200, however, is exemplary only and not limiting. The method 1200 may be altered, e.g., by having stages added, removed, or rearranged.

At stage 1202, the method includes initiating a wireless power transfer between a transmitter and a receiver, wherein the transmitter includes a foreign object detection (FOD) system and a living object protection (LOP) system. The base wireless charging system 302 may be a means for initiating the wireless power transfer. The base wireless charging system 302 includes a base charging system power converter 336 with a transmitter and a base system induction coil 304. The base wireless charging system 302 includes an object detection controller 380 operably coupled to a FOD system 382 and a LOP system 384. The electric vehicle charging system 314 includes an electric vehicle power converter 338 with a receiver and an electric vehicle induction coil 316. The base system induction coil 304 is configured to transmit an electrical signal at a power transfer frequency (e.g., 80-90 kHz), and the electric vehicle power converter 338 is configured to receive the electrical signal and generate a power output. For example, the power output may be configured as a battery charger.

At stage 1204, the method includes detecting a change in one or more power transfer parameters. In an example, the base charging system power converter 336 is configured to detect a change in a current level in the base system induction coil 304 (e.g., the electric current measurement through the induction coil 304). The object detection controller 380 may be configured to detect a change in the noise level (e.g., a signal noise value) on one or more loops in the FOD system 382. For example, the FOD system 382 may detect the noise generated on or near the power transfer frequency (e.g., 80-90 kHz). Other operating parameters may also be used to initiate a FOD calibration process.

At stage 1206, the method includes operating the LOP system in a high sensitivity mode. The object detection controller 380 is configured to communicate with the LOP system 384 and exchange device and detection parameters. For example, the object detection controller 380 may communicate with the LOP system 384 via a CAN interface. The LOP system 384 may be configured to operate in different sensitivity modes based on a control signal received from the object detection controller 380. The detection sensitivity of the LOP system may be based on the signal to noise ratio settings of one or more radar return signals. A high sensitivity mode may have a lower noise threshold (e.g., a lower signal-to-noise ratio) as compared to a standard detection mode. In an example, the sensitivity mode may be based on power output from the transmitters on the LOP system 384. The high sensitivity mode may utilize increased power output in an effort to improve the signal-to-noise ratio.

At stage 1208, the method includes performing a calibration procedure on the FOD system. The object detection controller 380 may be a means for performing he calibration procedure. The calibration system is performed concurrently with the LOP operating in high sensitivity mode. The object detection controller 380 is configured to perform the calibration procedure based on the change detected at stage 1204. The calibration procedure may include determining a FOD loop operating frequency with relatively low noise signal as compared to the noise generated at other frequencies in the operational band (e.g. 2.5-3.5 MHz). The calibration may be performed on the FOD loops individually or on multiple loops in different subsets may be calibrated simultaneously. The FOD loop sensitivity calibration procedure may take a few seconds to complete (e.g., 2, 4, 8, 16 seconds). While the FOD system 382 is performing the calibration procedure, the increased sensitivity of the LOP system may mitigate risks associated with the arrival a foreign object during the calibration procedure. If an object is detected by the LOP system 384 during the FOD calibration procedure, the object detection controller 380 may instruct the base wireless charging system 302 to halt a wireless power transfer until the object is removed. A user may be prompted to visually verify that the base pad is clear of foreign objects.

At stage 1210, the method includes operating the FOD system 382 and the LOP system 384 in a standard detection mode upon completing the calibration procedure. The base wireless charging system 302 may be a means for operating the FOD and LOP systems. The object detection controller 380 is configured to utilize information obtained during the calibration procedure at stage 1208 to operate the FOD system 382 in a standard detection mode. Standard detection mode may include comparing the impedance measured on one or more FOD loops to a threshold value. The standard detection mode for the LOP system 384 may include a relative increase in a detection threshold value as compared to the high sensitivity mode. The increase in the detection threshold may reduce the number of false positive detection signals. In operation in a standard detection mode, a detection signal from the FOD system 382 may cause a halt in the charging process while a detection signal from the LOP system 384 may cause a warning alarm with a temporary interruption of the charging process. The LOP system 384 may detect no further movement in the charging area within an amount of time (e.g., 1-5 s) and continue with the charging operation without user input. Objects detected by the FOD system 382 will require that the user confirm that the charge area is clean before resuming charging operations.

In an example, the object detection controller 380 may be configured to perform a start-up calibration procedure on the FOD system 382 before a wireless power transfer process begins. The object detection controller 380 instructs the LOP system 384 to operate in the high sensitivity mode during this start-up FOD calibration to help ensure the calibration is not effected by objects moving on to the base pad during the calibration process. If an object is detected by the LOP system 384 during a start-up calibration, the user may be prompted to visually inspect the base pad before initiating the wireless power transfer.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory processor-readable storage medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for halting a wireless charging operation, the apparatus comprising:
   a foreign object detection (FOD) system;
   a living object protection (LOP) system;
   a control circuit operably coupled to the FOD system and the LOP system, and configured to:
      operate the FOD system and the LOP system standard detection modes;
      operate the LOP system in a high sensitivity mode;
      execute a sensitivity calibration of the FOD system; and
      halt the wireless charging operation upon a detection of an object with the LOP system.

2. The apparatus of claim 1 wherein the FOD system comprises a plurality of FOD loops.

3. The apparatus of claim 1 wherein the control circuit is configured to continue the wireless charging operation and to resume operating the FOD system and the LOP system in the standard detection modes upon not detecting an object with LOP system.

4. The apparatus of claim 1 wherein the control circuit is configured to operate the LOP system in the high sensitivity mode and to execute the sensitivity calibration of the FOD system concurrently.

5. The apparatus of claim 1 wherein the control circuit is configured to operate the LOP system in the high sensitivity mode prior to executing the sensitivity calibration of the FOD system.

6. The apparatus of claim 1 wherein operating the FOD system in the standard detection mode includes operating the FOD system at a frequency of 2.5-3.5 MHz.

7. The apparatus of claim 1 wherein the LOP system is configured to operate at a first noise threshold during the standard detection mode and at a second noise threshold during the high sensitivity mode, such that the second noise threshold is lower than the first noise threshold.

8. The apparatus of claim 1 wherein the LOP system is configured to operate at frequency of 6.68 GHz.

9. The apparatus of claim 1 wherein the control circuit is configured to notify a user of a potential FOD or LOP object upon the detection of the object with the LOP system.

10. A method for halting a wireless charging operation, comprising:
    operating a foreign object detection (FOD) system and a living object protection (LOP) system in respective standard detection modes;
    operating the LOP system in a high sensitivity mode;
    executing a sensitivity calibration of the FOD system; and
    halting the wireless charging operation upon a detection of an object with the LOP system.

11. The method of claim 10 wherein the FOD system comprises a plurality of FOD loops.

12. The method of claim 10 further comprising continuing the wireless charging operation and to resume operating the FOD system and the LOP system in the respective standard detection modes upon not detecting an object with LOP system.

13. The method of claim 10 wherein operating the LOP system in the high sensitivity mode and executing the sensitivity calibration of the FOD system occur concurrently.

14. The method of claim 10 wherein operating the LOP system in the high sensitivity mode occurs prior to executing the sensitivity calibration of the FOD system.

15. The method of claim 10 wherein operating the FOD system in the standard detection mode includes operating the FOD system at a frequency of 2.5-3.5 MHz.

16. The method of claim 10 further comprising operating the LOP system at a first noise threshold during the standard detection mode and at a second noise threshold during the high sensitivity mode, such that the second noise threshold is lower than the first noise threshold.

17. The method of claim 10 wherein the LOP system is configured to operate at frequency of 6.68 GHz.

18. The method of claim 10 further comprising notifying a user of a potential FOD or LOP object upon the detection of the object with the LOP system.

19. An apparatus for halting a wireless charging operation, comprising:

means for operating a foreign object detection (FOD) system and a living object protection (LOP) system in respective standard detection modes;

means for operating the LOP system in a high sensitivity mode;

means for executing a sensitivity calibration of the FOD system; and means for halting the wireless charging operation upon a detection of an object with the LOP system.

20. The apparatus of claim 19 further comprising means for continuing the wireless charging operation and to resume operating the FOD system and the LOP system in the respective standard detection modes upon not detecting an object with LOP system.

* * * * *